United States Patent Office 3,283,796
Patented Nov. 8, 1966

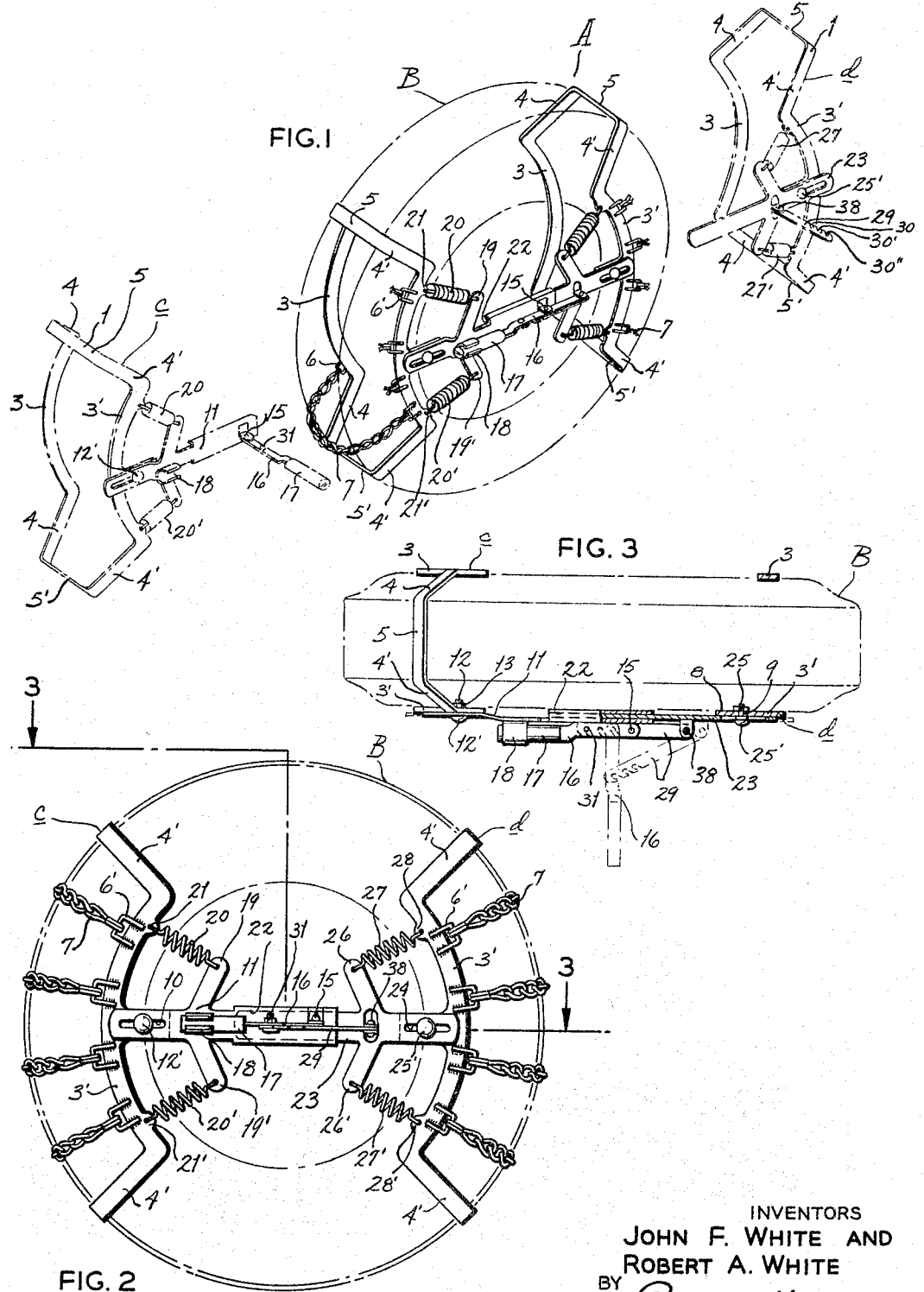

3,283,796
ANTI-SKID DEVICE
John F. White, 23 Stratford Lane, Brentwood, Mo., and Robert A. White, 3127 Rauschenback, St. Louis, Mo.
Filed May 24, 1965, Ser. No. 458,320
11 Claims. (Cl. 152—218)

This invention relates in general to traction devices for vehicle wheels and, more particularly, to an antiskid device for motor vehicle tires.

The utilization of low pressure tires on modern day motor vehicles has created a problem in the maintenance of anti-skid devices thereon. Heretofore tires with relatively high air pressure provided a substantial support for anti-skid devices so that accidental displacement of the same was rarely encountered. However, with low pressure tires a marked degree of flexibility, as well as yieldability, is provided so that retention of anti-skid devices thereon in reliable operative position has occasioned resort to various expedients, none of which have proved wholly satisfactory.

Furthermore, there has existed the ever-present problem of mounting anti-skid devices upon motor vehicle tires and removing same. Normally such operations are quite unpleasant entailing extreme difficulty in placing the devices upon the tires and then securing same in position; which operations are usually attendant with soiling of one's clothing. The difficulties of mounting and dismounting such devices is such that many motorists refrain from using anti-skid devices despite weather-indicated necessity.

Therefore, it is an object of the present invention to provide a novel anti-skid device which is adapted for disposition upon low pressure tires and incorporates means for positive maintainence thereon.

It is another object of the present invention to provide an anti-skid device for which may be readily mounted thereon and removed therefrom, without the use of tools, by the average motorist with minimum effort and discomfort.

It is a further object of the present invention to provide an anti-skid device incorporating a pair of cooperating components which are of simple, sturdy construction; which may be compactly stored when in disuse; which may be easily handled for installation and removal; which may be most economically manufactured; and which is reliable and durable in usage.

It is a still further object of the present invention to provide an anti-skid device of the character stated which incorporates novel means for eliminating the possibility of slippage.

It is another object of the present invention to provide an anti-skid device of the character stated which is uniquely equipped with means for absorbing shock occasioned through operation of relatively high speed vehicles with low pressure tires.

Other objects and details of the present invention will be apparent from the following description when read in connection with the accompanying drawing (one sheet) wherein:

FIGURE 1 is a perspective view of an anti-skid device constructed in accordance with and embodying the present invention, illustrating the same both in mounted operable position upon a motor vehicle tire and in inoperable or dismounted position.

FIGURE 2 is an outer side elevational view of the anti-skid device in mounted operable position upon a motor vehicle tire.

FIGURE 3 is a partial plan and sectional view taken on the line 3—3 of FIGURE 2, with the lever in position prior to locking, being shown in phantom lines.

Referring now by reference characters to the drawing which illustrates the preferred embodiment of the present invention, A generally designates an anti-skid device for disposition upon a conventional motor vehicle tire as indicated at B and comprising a pair of cooperable components $c$, $d$ each of which incorporates a chain support frame 1 fabricated from flat strip stock and having a pair of spaced apart, inner and outer, equal length, arcuate sections 3, 3' of narrow cross section; said sections 3, 3' being formed upon a center substantially concentric with tire B and on an arc of approximately 90°. Sections 3, 3' are aligned for presentation on opposite sides of tire B. At each of their opposite ends arcuate sections 3, 3' are continuous with arms 4, 4' which extend radially outwardly from the associated arcuate sections 3, 3' and are in substantially normal axial relationship; arms 4, 4' of one section 3 or 3' being aligned with the corresponding arm 4, 4' of the other such section, but being in mutual converging relationship.

The aligned arms 4, 4 and 4', 4' of each frame 1 are interconnected at their outer ends by a flat tire tread-engaging web 5, 5', respectively. It will thus be seen that each chain support frame 1 is of general saddle formation being inwardly opening between the respective sections 3, 3' for receiving a segment of tire B, all as may best be seen in FIGURE 1. The linear extent of arms 4, 4' is such as to locate arcuate sections 3, 3' when mounted proximate, but radially outwardly of, the inner edge portion of the side wall of tire B. The converging character of aligned arms 4, 4 and 4', 4' of each frame 1 bring about a desired conformity to the contour of the outer portion of the tire side wall for inducing a snug engagement thereon. The distance between inner and outer arcuate sections 3, 3' of each frame 1 is such as to allow ease of disposition of said frames upon tire B and yet permit the same to be in contiguity with the adjacent portions of said tire.

Arcuate sections 3, 3' of each frame 1 are provided throughout their extent with a plurality of spaced-apart aligned brackets 6, 6', respectively, for supporting the ends of tread-engaging, traction-producing members 7, such as lengths of flexible, link-chains, which extend between said brackets and about the tread of tire B; serving also to further integrate frames 1. There may be any preselected number of members 7 although in the drawing the provision of four of the same are shown since such an arrangement has proved fully effective. Other types of traction-producing members than chains may be utilized, if desired.

Rigid with each outer section 3, 3' of each frame 1, being co-planar therewith and projecting from the center thereof toward the center of tire B, is a short, narrow mounting plate 8 which is provided with an opening 9. Aligned with opening 9 on mounting plate 8 of frame 1 of component $c$ is an enlarged aperture or slot formed in the outer end of an elongated locking arm 11 of such length as to extend beyond the center of tire B. It will be seen that the axis of locking arm 11 is perpendicular to the chord of the arc upon which the related arcuate section 3 is formed. Passing through slot 10 and aligned opening 9 is a bolt 12 having an enlarged head 12' and is maintained in position by a nut 13. The stem of bolt 12 is smooth so that despite the abutment of the under side of head 12' against the outer adjacent face of arm 11 lengthwise relative movement of the latter with respect to adjacent plate 8 may be brought about under sufficient force.

Proximate its frame-remote end and on its outer face, locking arm 11 is provided with a pivot mounting 15, such as a pair of angle clips, for one end of a lever 16 having an enlarged handle at its opposite or free end; said lever 16 being swingable about mounting 15, at least through an arc of 90°, from axial perpendicularity to said arm 11 or open position (as indicated in phantom line in FIGURE 3) to substantially axial parallelism thereto, or closed position, as shown in full lines in FIGURES 1 and 3, wherein handle 17 is grippingly received within a locking grip 18 carried upon arm 11 near the inner end of slot 10.

Projecting from the opposite side edges of arm 11 at points immediately adjacent clip 18 are short extensions or wings 19, 19' which are mutually axially inclined and are each engaged in their outer portions to one end of tension springs 20, 20' respectively, the other ends of which are suitably connected to, as hookingly therein, bosses 21, 21' respectively, provided with arcuate segment 3' of chain frame 1.

At its frame-remote or free end portion locking arm 11 is formed to present an end-opening, axially extending socket or grooved receptacle 22 for receiving the free end portion of a companion or male locking arm 23 of component d.

Locking arm 23 is of similar configuration as locking arm 11 in that it embodies an elongated slot-like aperture 24 with opening 9 in plate 8 of chain support frame 1 of said component d; there being a bolt 25 passing through said slot 24 and aligned opening 9, having a head 25' abutting the outer face of locking arm 23, yet allowing of relative movement between said arm 23 and the associated frame 1. Said locking arm 23 is provided with a pair of extensions 26, 26', being in all respects structurally similar to, and of like relation to above described arm 23 as extensions 19, 19' of arm 11. Engaged to the extensions 26, 26' is one end of a tension spring 27, 27' respectively, the other ends of which are received within bosses 28, 28' respectively, formed on an outer arcuate section 3' of chain support frame 1 of component d. Tension springs 27 and 20', and 27' and 20, are in substantial axial parallel relationship.

Disposed on locking arm 23 at a point between extensions 26, 26' is a pivot mounting 38 for one end of a link 29 for swingable movement toward and away from arm 23. Along its normally forwardly presented edge link 29 is provided with a plurality of spaced-apart outwardly opening, inclined locking recesses or notches 30, 30' for selectedly receiving the shank of a bolt 31 fixed in and projecting through lever 16 adjacent handle 17. Thus, link 29 and lever 16 may be engaged for unitary action in a manner to be described hereinbelow. Companion or male locking arm 23 is of such length as to project beyond the center of tire B, so that said locking arms 11, 23 will overlap in the central zone of said tire B whereby the free end of arm 23 is fittedly accepted within socket 22 when components c, d of device A are interengaged.

The operation for installing device A upon tire B is easily accomplished, consisting of a series of distinct steps readily followed by the average motorist. Each component c, d is generally of light weight so that the user may position same simultaneously with but limited effort upon opposed side portions of tire B (FIGURE 1) with the associated frames 1 straddling said tire B. Said components c, d are directed toward each other to effect mutual union by reception of the free end of arm 23 within its complementary socket 22; it being recognized that lever 16 is in open position as shown in phantom lines in FIGURE 3. The user may then grasp lever handle 17 to hold components c, d in position and with the other hand engage bolt 31 within the selected one of the recesses 30, 30' of link 29, as necessitated by size of tire B. With link 29 thus engaged to lever 16 the user will then swing lever arm 16 toward locking arm 11 in the position shown in full lines in FIGURE 3 for ultimate engagement within clip 18. Such action will force locking arms 11, 22 axially toward each other, achieving maximum penetration of locking arm 23 within socket 22. Such movement of lever 16 is against the bias of tension springs 20, 20', 27, 27' which normally tend to urge arms 23, 11 axially away from each other, as toward their related frames 1, whereby limited travel of said arms 11, 22 relative to the respective mounting plates 8 is brought about. Springs 20, 20', 27, 27' are thus extended and placed under stress conducing to the snug disposition of chain support frames 1 of components c, d upon tire B as the latter, under spring tension, are urged toward each other. With lever handle 17 thus secured within clip 18 the anti-skid device is firmly presented in operative position and will reliably remain so during all the vicissitudes of usage. The tension of springs 20, 20', 27, 27' prevents accidental slippage of chain support frames 1 either circumferentially of tire B or radically outwardly thereof so that dislodgement or displacement is obviated. The said springs act to assure that device A may be used with safety and confidence upon low pressure motor vehicle tires, with maximum traction being provided at all times and under all conditions through the constant forcing of traction-producing members 7 into close engagement about the received portions of tire B.

Removal of anti-skid device A from tire B is easily effected, being the reverse of the installation procedure. Upon outward withdrawal of lever 16 from engagement within clip 18 an immediate release of the tension of springs 20, 20', 27, 27' occurs, permitting facile disengagement of link 29 from lever 16 so as to free components d, c for mutual parting action.

Thus, the installation and removal of anti-skid device A may be accomplished without resort to tools and without the necessity of the user attempting to effect disposition on relatively inacceptable portions of tire B since the entire operation may be easily brought about from the outer face of said tire B. Components c, d of device A are compact and of lightweight and are so designed that they may be easily interfitted, as by nesting, for storage in minimum space during periods of disuse.

It should be understood that changes and modifications in the formation, construction, and arrangement and combination of the several parts of the anti-skid device may be made and substituted for these herein shown and described without departing from the nature and principle of our invention.

Having described our invention what we desire to obtain by Letters Patent is:

1. An anti-skid device for a wheel tire having side walls and a tread surface comprising first and second cooperable components, each component having a tire-segment receiving frame and a locking arm, each of said locking arms being mounted for slideable movement toward and away from the related tire-segment receiving frame, means for interengaging the locking arms of said components, and resilient means interengaging each locking arm and its associated tire-segment receiving frame for urging said locking arms toward the related tire-segment receiving frame whereby said frames are brought into snug relationship upon said tire upon interengagement of said locking arms.

2. An anti-skid device for a wheel tire having side walls and a tread surface comprising first and second cooperable components, each component comprising a frame open at one side and at its ends for receiving a portion of said tire, traction-producing elements secured on said frames for closing the opposite sides thereof and for disposition against the tire tread surface, a locking arm carried on each frame, each locking arm being mounted for slideable movement toward and away from the related frame, means for interengaging the locking arms of said frames, and resilient means interengaging each locking arm and its related tire-segment receiving frame for biasing each locking arm toward its associated frame for urging said frames into snug relationship upon said tire upon interengagement of said locking arms.

3. An anti-skid device as defined in claim 2 and further characterized by said frames being of arcuate contour being formed on a center substantially concentric with the tire, and the locking arms being axially normal to the chord of the arc upon which said frames are formed.

4. An anti-skid device as defined in claim 2 and further characterized by each frame being of arcuate contour defining an angle of substantially 90° for receiving opposite portions of the tire, said locking arms being axially normal to the chord of the arc upon which the respective frames are formed whereby said locking arms will extend toward the center of the tire.

5. An anti-skid device as defined in claim 2 and further characterized by said locking arms being of such length that at their ends remote from the related frame the same will be adapted for mutual overlapping relationship and by said frame members being concave on their tire-center confronting side portions.

6. An anti-skid device as defined in claim 2 and further characterized by a pair of wings provided on each locking arm and projecting from opposite side edges thereof and said resilient means comprising coil springs connecting each of said wings to the related tire-segment receiving frame.

7. An anti-skid device as defined in claim 2 and further characterized by said means for interengaging the locking arms of said components comprising a lever swingably mounted on one of said locking arms and lever engaging means being provided on the other of said locking arms, said lever being mounted for swinging in a plane normal to the plane of the wheel tire.

8. An anti-skid device as defined in claim 2 and further characterized by said means for interengaging the locking arms of said components comprising a lever swingably mounted on one of said locking arm, lever-receiving means provided on the other of said locking arms, said other of said locking arms being provided with an axial socket for receiving the proximate end portion of the lever-carrying locking arm.

9. An anti-skid device for a vehicle tire having side walls and a tread surface comprising first and second cooperable components, each component comprising a frame open at one side and its ends for receiving a portion of said tire, said frames being of arcuate contour for straddling disposition upon said tire and being formed on a center substantially concentric with the tire, a locking arm carried on each frame and being axially normal to the chord of the arc upon which said frames are formed, said locking arms being of such length that at their ends remote from the related frame the same are adapted for mutual overlapping relationship, one of said arms carrying a socket at its frame-remote end for receiving the frame-remote end of the other locking arm, resilient means urging said locking arms axially away from each other, and mechanical means for overcoming the urging of said resilient means for effecting reliable interengagement between said locking arms.

10. An anti-skid device as defined in claim 9 and further characterized by said resilient means comprising coil springs connecting said locking arms to their respective frames.

11. An anti-skid device as defined in claim 10 and further characterized by said mechanical means comprising a lever swingably mounted on one of said locking arms and a link engageable with said lever swingably mounted on the other of said locking arms.

References Cited by the Examiner
UNITED STATES PATENTS

| 2,729,261 | 1/1956 | Rucker | 152—218 |
| 2,886,091 | 5/1959 | Hines | 152—228 |
| 2,990,868 | 7/1961 | Steele | 152—218 |

ARTHUR L. LA POINT, *Primary Examiner.*

C. W. HAEFELE, *Assistant Examiner.*